US006457439B1

(12) United States Patent
Engelking

(10) Patent No.: US 6,457,439 B1
(45) Date of Patent: Oct. 1, 2002

(54) BIRD PERCH APPARATUS

(76) Inventor: Margaret E. Engelking, 415 Stockton, San Antonio, TX (US) 78216

( * ) Notice: Subject to any disclaimer, the term of this patent is extended or adjusted under 35 U.S.C. 154(b) by 0 days.

(21) Appl. No.: 09/802,572

(22) Filed: Mar. 9, 2001

(51) Int. Cl.[7] ............... A01K 31/12; A01K 15/02
(52) U.S. Cl. ............... 119/537; 119/468; 119/702
(58) Field of Search ............... 119/537, 468, 119/57.8, 57.9, 531, 702, 705

(56) References Cited

U.S. PATENT DOCUMENTS

| | | | | |
|---|---|---|---|---|
| 230,993 A | * | 8/1880 | Bishop | |
| 471,348 A | * | 3/1892 | Collis | 248/55 |
| 1,180,595 A | * | 4/1916 | Lydecker | |
| 2,483,033 A | * | 9/1949 | Fischer | |
| 2,707,936 A | * | 5/1955 | Kiehl | |
| 3,590,780 A | * | 7/1971 | Dunbar | 119/57.9 |
| 4,019,462 A | * | 4/1977 | Palfalvy | 119/51.5 |
| 4,328,636 A | * | 5/1982 | Johnson | 43/107 |
| 4,542,714 A | * | 9/1985 | Ingraham et al. | 119/708 |
| 5,265,557 A | * | 11/1993 | Lovitz | |
| 5,634,430 A | * | 6/1997 | Brostowicz | 119/57.8 |
| D386,834 S | * | 11/1997 | Nissim et al. | |
| 5,713,305 A | * | 2/1998 | Hollaway et al. | 119/464 |

* cited by examiner

Primary Examiner—Peter M. Poon
Assistant Examiner—Son T. Nguyen
(74) Attorney, Agent, or Firm—Jackson Walker L.L.P.

(57) ABSTRACT

A bird perch apparatus for providing birds with an aerial toy that encourages climbing swinging. The bird perch apparatus includes a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

14 Claims, 5 Drawing Sheets

BIRD PERCH APPARATUS

BACKGROUND OF THE INVENTION

1. Field of the Invention

The present invention relates to bird perch apparatuses and more particularly pertains to a new bird perch apparatus for providing birds with an aerial toy that encourages climbing swinging.

2. Description of the Prior Art

The use of bird perch apparatuses is known in the prior art. More specifically, bird perch apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,265,557; U.S. Pat. No. 2,707,936; U.S. Pat. No. 2,483,003; U.S. Pat. No. 1,180,595; U.S. Pat. No. 230,993; and U.S. Pat. No. Des. 386,834.

While these devices fulfill their respective, particular objectives and requirements, the aforementioned patents do not disclose a new bird perch apparatus. The inventive device includes a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

In these respects, the bird perch apparatus according to the present invention substantially departs from the conventional concepts and designs of the prior art, and in so doing provides an apparatus primarily developed for the purpose of providing birds with an aerial toy that encourages climbing swinging.

SUMMARY OF THE INVENTION

In view of the foregoing disadvantages inherent in the known types of bird perch apparatuses now present in the prior art, the present invention provides a new bird perch apparatus construction wherein the same can be utilized for providing birds with an aerial toy that encourages climbing swinging.

The general purpose of the present invention, which will be described subsequently in greater detail, is to provide a new bird perch apparatus apparatus and method which has many of the advantages of the bird perch apparatuses mentioned heretofore and many novel features that result in a new bird perch apparatus which is not anticipated, rendered obvious, suggested, or even implied by any of the prior art bird perch apparatuses, either alone or in any combination thereof.

To attain this, the present invention generally comprises a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bird perch apparatus apparatus and method which has many of the advantages of the bird perch apparatuses mentioned heretofore and many novel features that result in a new bird perch apparatus which is not anticipated, rendered obvious, suggested, or even implied by any of the prior art bird perch apparatuses, either alone or in any combination thereof.

It is another object of the present invention to provide a new bird perch apparatus, which may be easily and efficiently manufactured and marketed.

It is a further object of the present invention to provide a new bird perch apparatus, which is of a durable and reliable construction.

An even further object of the present invention is to provide a new bird perch apparatus which is susceptible of a low cost of manufacture with regard to both materials and labor, and which accordingly is then susceptible of low prices of sale to the consuming public, thereby making such bird perch apparatus economically available to the buying public.

Still yet another object of the present invention is to provide a new bird perch apparatus which provides in the apparatuses and methods of the prior art some of the advantages thereof, while simultaneously overcoming some of the disadvantages normally associated therewith.

Still another object of the present invention is to provide a new bird perch apparatus for providing birds with an aerial toy that encourages climbing swinging.

Yet another object of the present invention is to provide a new bird perch apparatus which includes a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

Still yet another object of the present invention is to provide a new bird perch apparatus that would be easy to mount inside the cage and would provide the bird with a new way to entertain itself. Watching the bird frolic on the unit would also be entertaining for the bird owner.

Even still another object of the present invention is to provide a new bird perch apparatus that would be of durable construction and have additional attachments to further the birds exercise and entertainment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
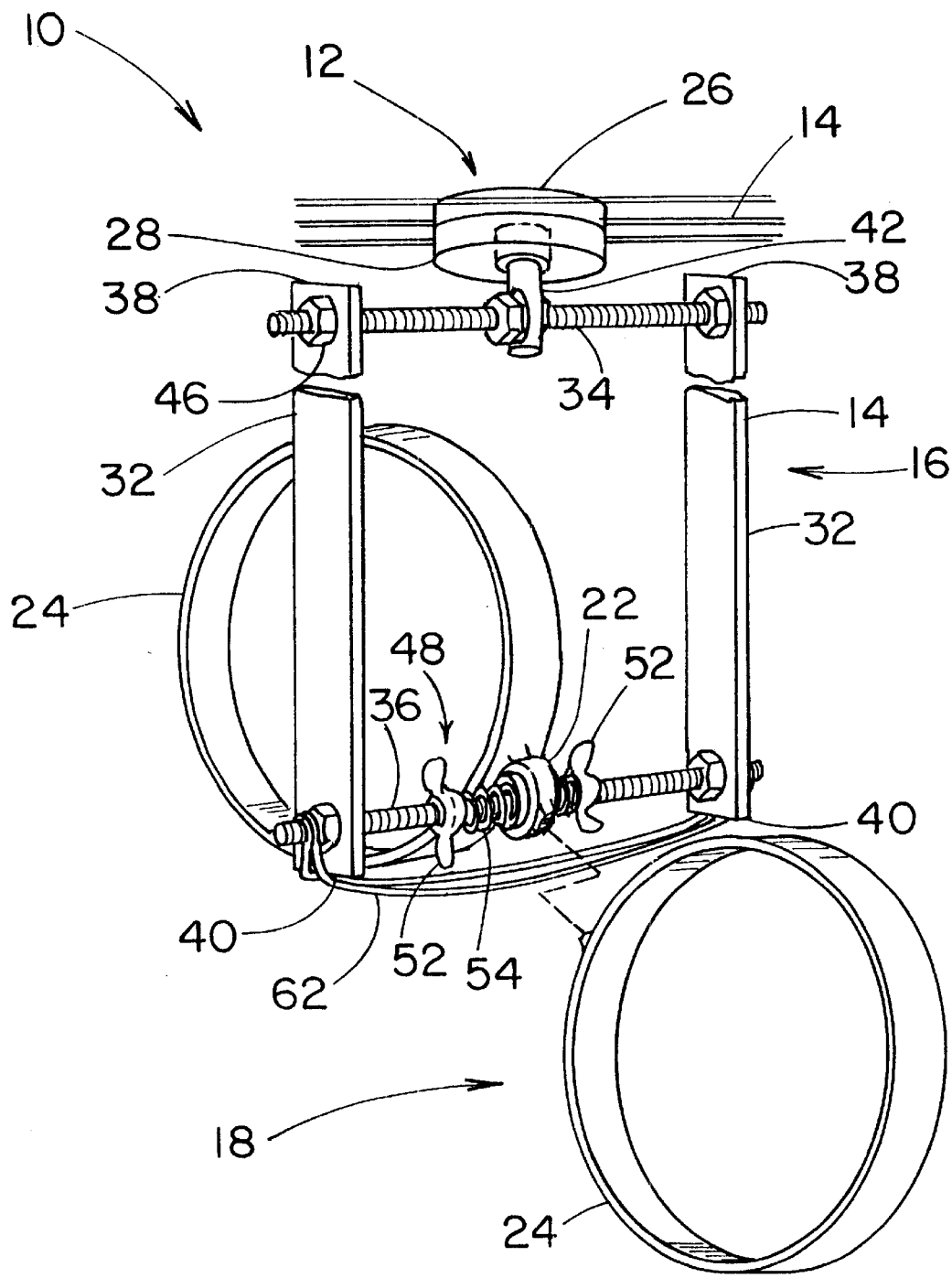
FIG. 1 is a perspective view of a new bird perch apparatus according to the present invention.
Figure 2:
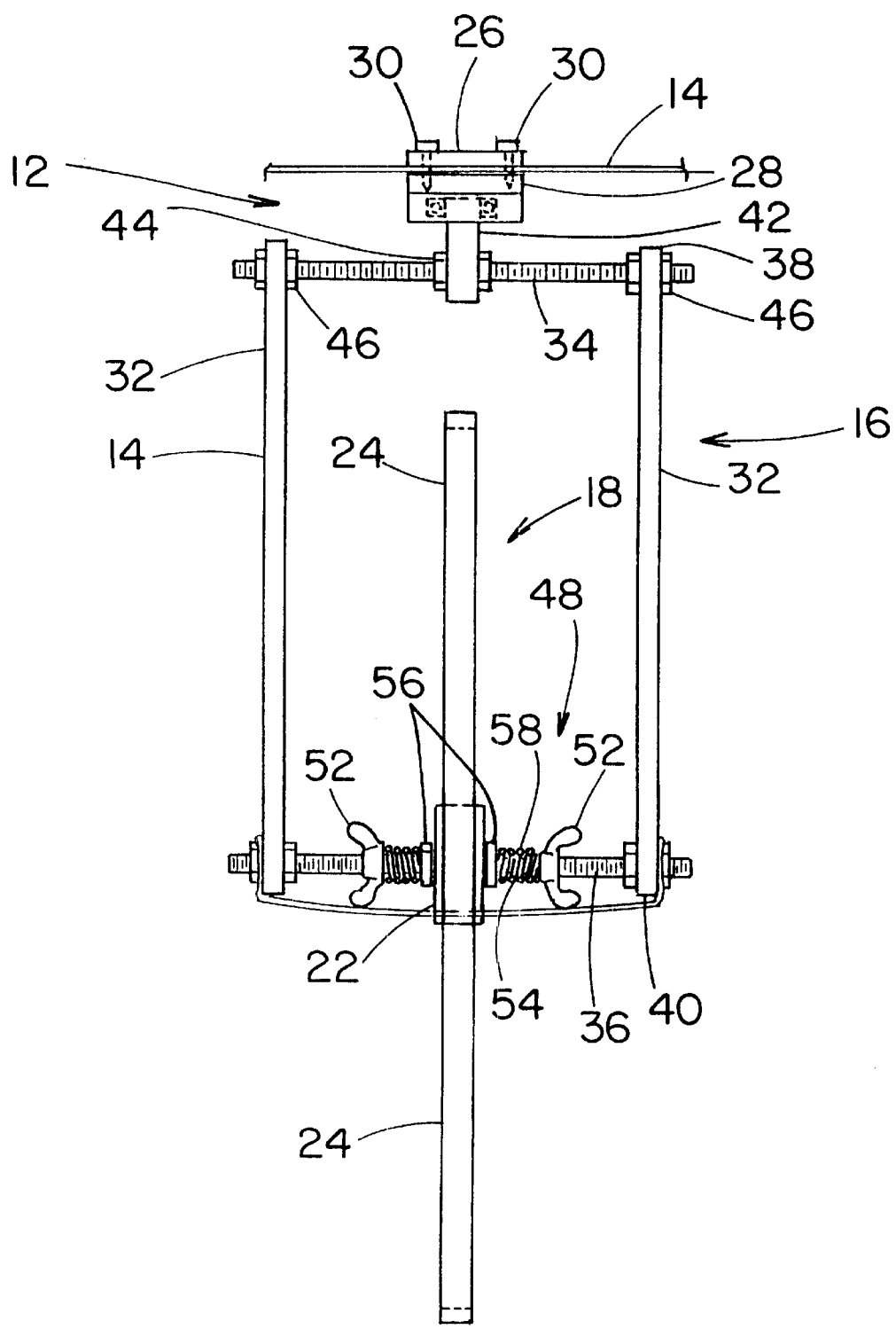
FIG. 2 is an end view of the present invention.
Figure 3:
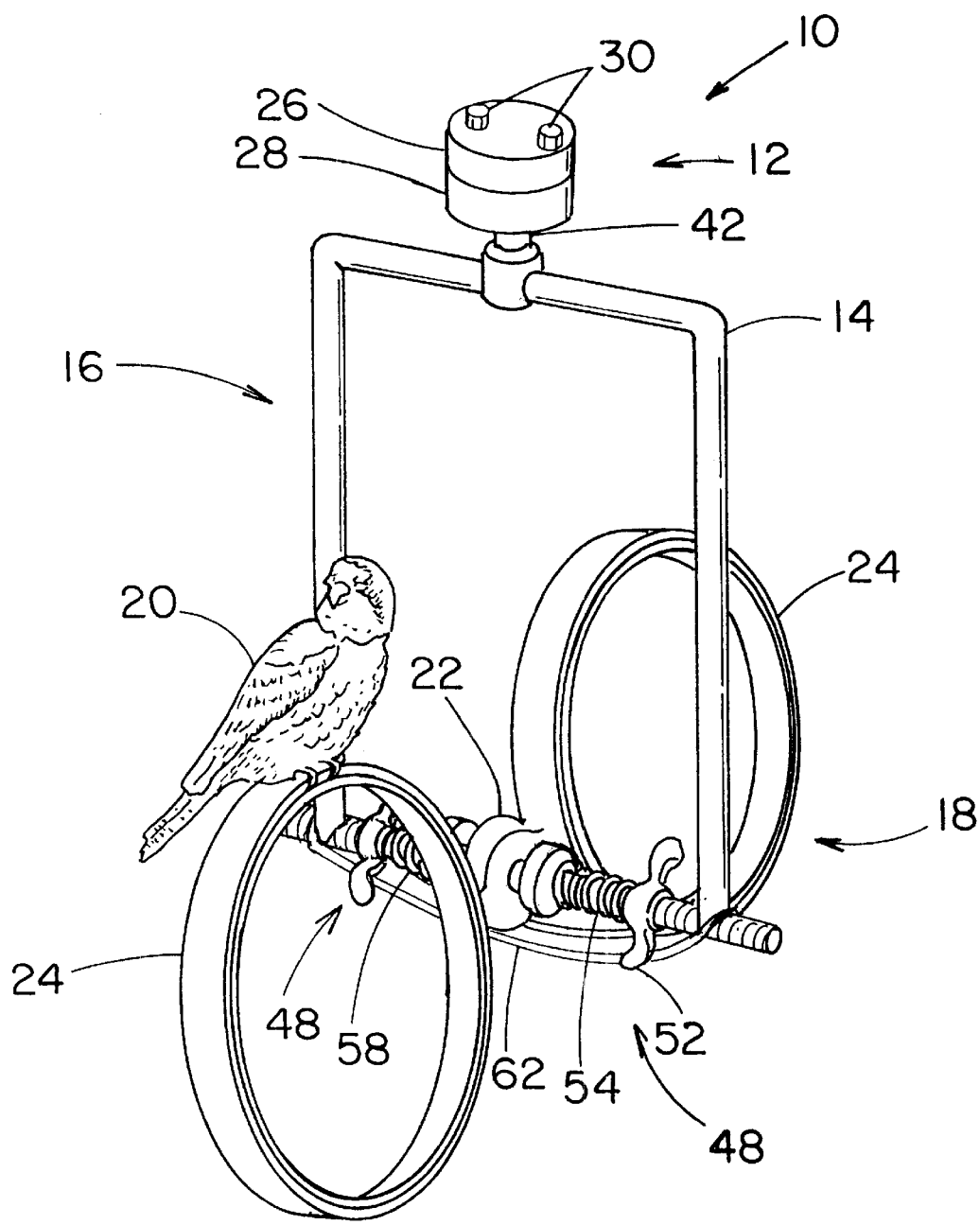
FIG. 3 is a perspective view of the present invention.
Figure 4:
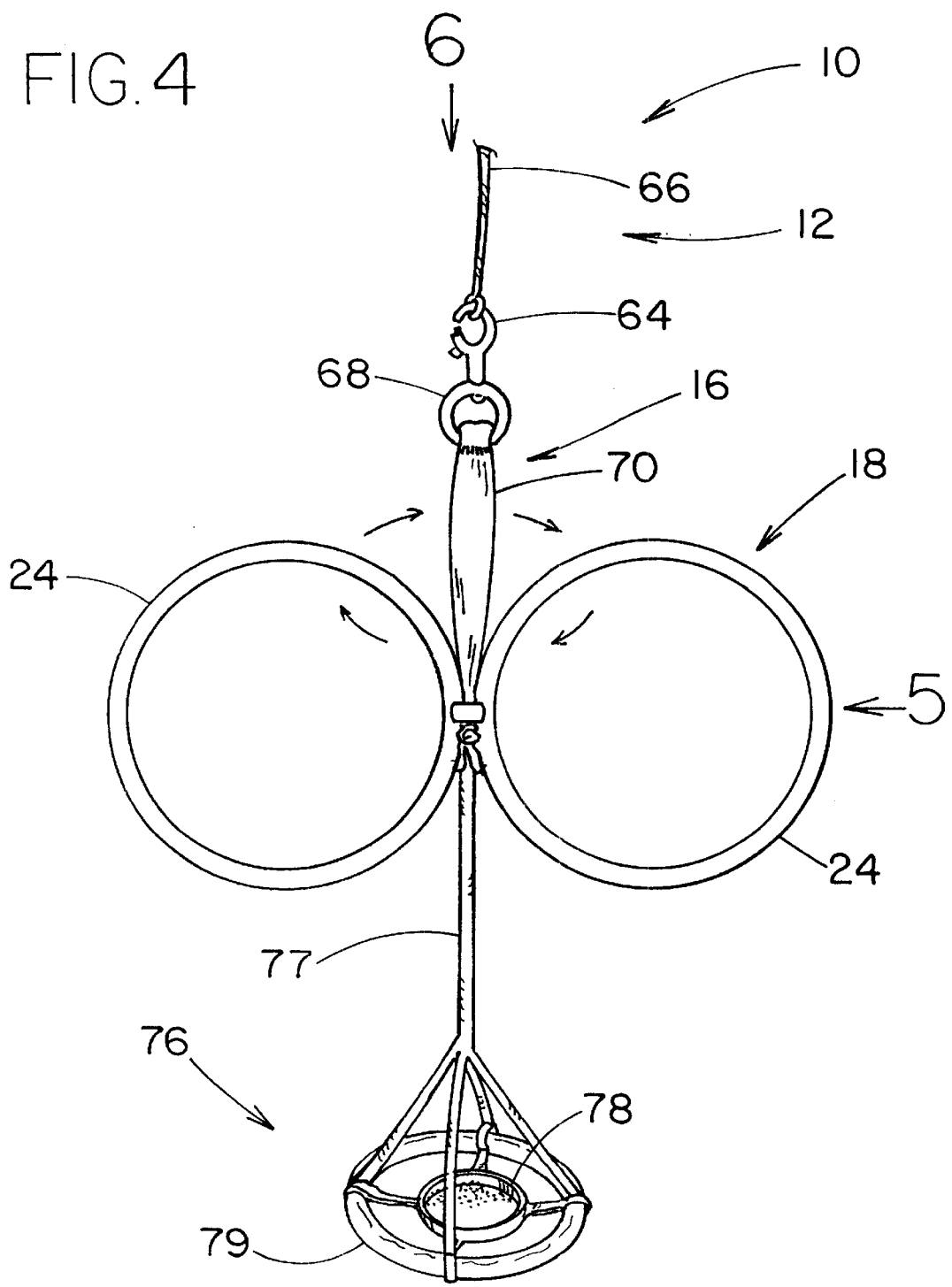
FIG. 4 is a side view of the present invention.
Figure 5:
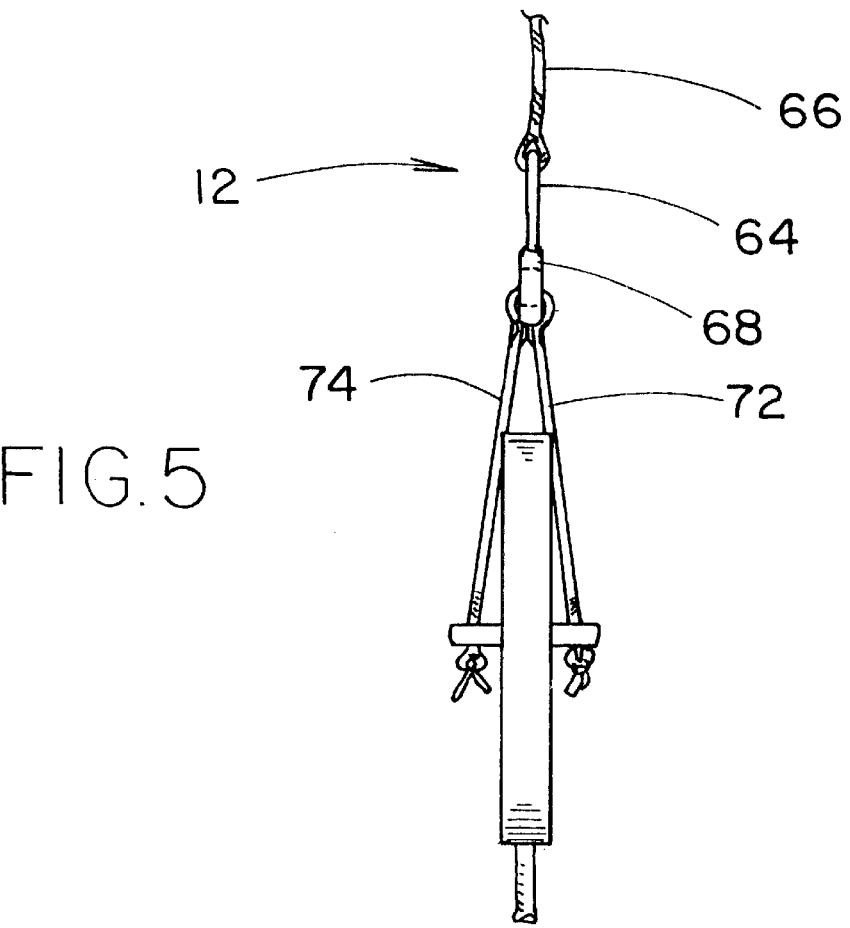
FIG. 5 is an end view of the present invention.
Figure 6:
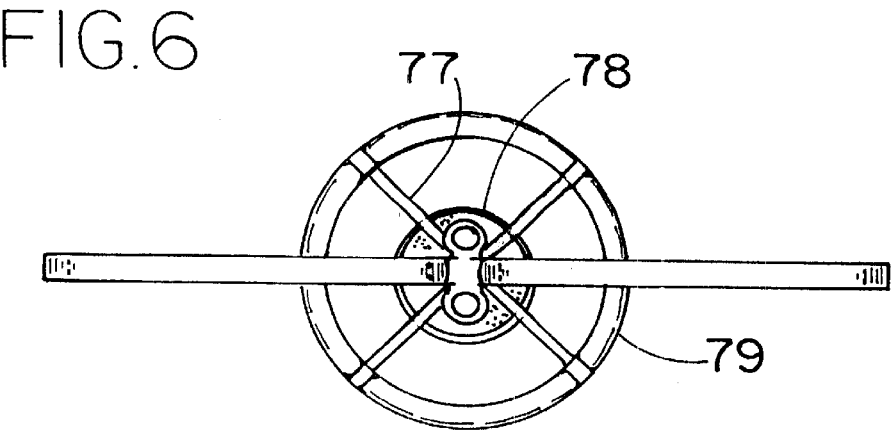
FIG. 6 is a side view of the present invention.

With reference now to the drawings, and in particular to FIGS. 1 through 6 thereof, a new bird perch apparatus embodying the principles and concepts of the present invention and generally designated by the reference numeral 10 will be described.

As best illustrated in FIGS. 1 through 6, the bird perch apparatus 10 generally includes a mounting assembly 12 that is adapted to be coupled to a support structure 14. A support assembly 16 is rotatably coupled to the mounting assembly 12. A perch assembly 18 is rotatably coupled to the support assembly 16 such that the perch assembly 18 is adapted for permitting perching of the bird 20. The perch assembly 18 has a mounting portion 22 is coupled to the support assembly 16. The perch assembly 18 has a pair of annular rings 24 that are diametrically coupled to the mounting portion 22 such that each of the annular rings 24 is adapted for permitting perching of the bird 20.

The mounting assembly 12 is adapted to be coupled to a cage. The mounting assembly 12 has an upper plate 26 and a lower plate 28 such that the upper plate 26 is adapted for being positioned outside of the cage and the lower plate 28 is adapted to be positioned inside of the cage proximate the upper plate 26. The upper plate 26 and the lower plate 28 is adapted for compressing the cage between the upper plate 26 and the lower plate 28 when the upper plate 26 is coupled to the lower plate 28 by a plurality of fasteners 30.

The support assembly 16 has pair of sidebars 32, a first support member 34 and a second support member 36. The first support member 34 is coupled between a first end 38 of each of the sidebars 32, the second support member 36 is coupled between a second end 40 of each of the sidebars 32. The mounting portion 22 of the perch assembly 18 is rotatably coupled to the second support member 36 whereby the perch assembly 18 is rotatable between the side bars 32.

A connecting bar 42 has a bore 44 such that the bore 44 of the connecting bar 42 received the first support member 34 whereby the connecting bar 42 is selectively positionable along a length of the first support member 34. The connecting bar 42 is rotatably coupled to the mounting assembly 12.

The first support member 34 is threaded, a pair of threaded connectors 46 is engaged to the first support member 34 such that each of the pair of threaded connectors 46 are positioned on opposite sides of the connecting bar 42. The threaded connectors 46 are for maintaining the position of the connecting bar 42 relative to the first support member 34.

A pair of adjustment assemblies 48 for engaging the second support member 36 such that each of the adjustment assemblies 48 are for engaging opposite sides of the mounting portion 22 of the perch assembly 18. The adjustment assemblies 48 are for producing tension against the mounting portion 22 of the perch assembly 18 for controlling resistance to rotation of the annular rings 24 of the perch assembly 18 around the second support member 36 when the bird 20 lands on one of the annular rings 24. Each of the adjustment assemblies 48 includes a threaded coupler 52, a biasing member 54 and a washer 56. The washer 56 is positioned adjacent the mounting portion 22 of the perch assembly 18, the threaded coupler 52 is for threadably engaging the second support member 36 such that the biasing member 54 is positioned between the threaded coupler 52 and the washer 56. The threaded coupler 52 is positionable closer to the mounting portion 22 of the perch assembly 18 such that the biasing member 54 compresses the washer 56 against the mounting portion 22 of the perch assembly 18 for increasing resistance to rotation. The threaded coupler 52 is positionable away from the mounting portion 22 of the perch assembly 18 such that the biasing member 54 reduces compression against the washer 56 for decreasing resistance to rotation.

The biasing member 54 includes a spring 58 for adjusting compression between the threaded coupler 52 and the washer 56. The washer includes a friction enhancing material 60 such that when compression between the mounting portion 22 of the perch assembly 18 and the washer 56 is increased the friction between the washer 56 and the mounting portion 22 of the perch assembly 18 is increased.

A plurality of elastic bands 62 is coupled to the support assembly 16 such that rotation of the perch assembly 18 with respect to the support assembly 16 facilitates winding of the elastic bands 62 between the perch assembly 18 and the support assembly 16. The elastic bands 62 unwinding upon ceasing of rotation of the perch assembly 18 such that the elastic bands 62 facilitate reversal of rotation of the perch assembly 18 with respect to the support assembly 16.

In an embodiment the present invention can be mounted to a support structure 14 for a bird 20 to perch upon, the bird perch apparatus; a mounting assembly 12 that is adapted to be coupled to a support structure 14. A support assembly 16 is rotatably coupled to the mounting assembly 12. A perch assembly 18 is rotatably coupled to the support assembly 16 such that the perch assembly 18 is adapted for permitting perching of the bird 20. The perch assembly 18 has a mounting portion 22 is coupled to the support assembly 16. The perch assembly 18 has a pair of annular rings 24 that are diametrically coupled to the mounting portion 22 such that each of the annular rings 24 is adapted for permitting perching of the bird 20.

The mounting assembly 12 includes a clasp portion 64 and a cord 66 such that the cord 66 is adapted for is coupled to a tree limb. The clasp portion 64 removably engages the cord 66 for permitting selective removal of the clasp portion 64 from the tree limb.

The support assembly 16 includes a support ring 68 and a support strap 70. The support ring 68 is rotatably coupled to the mounting assembly 12. The support strap 70 is extended through the support ring 68 such that each of a pair of opposing ends of the support strap 70 are coupled to diametrically opposed apertures of the mounting portion 22 of the perch assembly 18. The support ring 68 is for permitting rotation of the perch assembly 18 in respect to the mounting assembly 12.

The support strap 70 has a first portion 72 and a second portion 74. The first portion 72 is secured to the second portion 74 below the support ring 68 for preventing tipping of the perch assembly 18 when the bird 20 is perched upon the perch assembly 18.

A feeding assembly 76 is suspended from the mounting portion 22 of the perch assembly 18 such that the feeding assembly 76 is adapted for permitting the bird 20 to feed on birdseed. The feeding assembly 76 has a strap member 77 and a dish portion 78. The strap member 77 is coupled to the mounting portion 22 of the perch assembly 18. The strap member 77 is for suspending the dish portion 78 below the perch assembly 18 for preventing the bird 20 perched on the dish portion 78 from being struck by the perch assembly 18 when another bird 20 lands upon the perch assembly 18, the dish portion 78 is adapted for holding bird seed. A perching member 79 is coupled between the dish portion 78 and the strap member 77 such that the perching member 79 is adapted for permitting the bird 20 to perch while eating birdseed from the dish portion 78.

In use, a user would attach the unit with the vice mount to the roof of the bird's cage. When the bird jumps on the present invention, it would spin in a circle, enabling the bird to spin horizontally and vertically at the same time.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bird apparatus for mounting to a support structure for a bird to perch upon, the bird perch apparatus comprising:

a mounting assembly being adapted for coupling to a support structure;

a support assembly being rotatably coupled to said mounting assembly wherein said support assembly has pair of side bars, a first support member and a second support member, said first support member being coupled between a first end of each of said side bars, said second support member being coupled between a second end of each of said side bars such that said mounting portion of said perch assembly is rotatably coupled to said second support member whereby said perch assembly is rotatable between said side bars;

a perch assembly being rotatably coupled to said support assembly such that said perch assembly is adapted for permitting perching of the bird, said perch assembly having a mounting portion being coupled to said support assembly, said perch assembly having a pair of annular rings being diametrically coupled to said mounting portion such that each of said annular rings is adapted for permitting perching of the bird; and, connecting bar having a bore such that said bore of said connecting bar is for receiving said first support member whereby said connecting bar is selectively positionable along a length of said first support member, said connecting bar being rotatably coupled to said mounting assembly.

2. The bird perch apparatus as set forth in claim 1, wherein said first support member is threaded, a pair of threaded connectors being for engaging said first support member such that each of said pair of threaded connectors are positioned on opposite sides of said connecting bar whereby said threaded connectors are for maintaining the position of said connecting bar relative to said first support member.

3. The bird perch apparatus as set forth in claim 1, further comprising:

a plurality of elastic bands being coupled to said support assembly such that rotation of said perch assembly with respect to said support assembly facilitates winding of said elastic bands between said perch assembly and said support assembly, said elastic bands unwinding upon ceasing of rotation of said perch assembly such that said elastic bands facilitate reversal of rotation of said perch assembly with respect to said support assembly.

4. The bird perch apparatus as set forth in claim 1, wherein said mounting assembly comprises a clasp portion and a cord such that said cord is adapted for being coupled to a tree limb, said clasp portion removably engages said cord for permitting selective removal of said clasp portion from the tree limb.

5. The bird perch apparatus as set forth in claim 1, wherein said support assembly comprises a support ring and a support strap, said support ring being rotatably coupled to said mounting assembly, said support strap being for extending through said support ring such that each of a pair of opposing ends of said support strap are coupled to diametrically opposed apertures of said mounting portion of said perch assembly, said support ring being for permitting rotation of said perch assembly in respect to said mounting assembly.

6. The bird perch apparatus as set forth in claim 5, wherein said support strap has a first portion and a second portion, said first portion being secured to said second portion below said support ring for preventing tipping of said perch assembly when the bird is perched upon said perch assembly.

7. The bird perch apparatus as set forth in claim 1, further comprising:

a feeding assembly being suspended from said mounting portion of said perch assembly such that said feeding assembly is adapted for permitting the bird to feed on birdseed.

8. The bird perch apparatus as set forth in claim 7, wherein said feeding assembly has a strap member and a dish portion, said strap member being coupled to said mounting portion of said perch assembly such that said strap member is for suspending said dish portion below said perch for preventing the bird perched on said dish portion from being struck by said perch assembly when another bird lands upon said percha assembly, said dish portion being adapted for holding bird seed.

9. The bird perch apparatus as set forth in claim 8, further comprising:

a perching member being coupled between said dish portion and said strap member such that said perching member is adapted for permitting the bird to perch while eating bird seed from said dish portion.

10. A bird apparatus for mounting to a support structure for a bird to perch upon, the bird perch apparatus comprising:

a mounting assembly being adapted for coupling to a support structure;

a support assembly being rotatably coupled to said mounting assembly wherein said support assembly has pair of side bars, a first support member and a second support member, said first support member being coupled between a first end of each of said side bars, said second support member being coupled between a second end of each of said side bars such that said mounting portion of said perch assembly is rotatably coupled to said second support member whereby said perch assembly is rotatable between said side bars;

a perch assembly being rotatably coupled to said support assembly such that said perch assembly is adapted for permitting perching of the bird, said perch assembly having a mounting portion being coupled to said support assembly, said perch assembly having a pair of annular rings being diametrically coupled to said mounting portion such that each of said annular rings is adapted for permitting perching of the bird; and, a pair of adjustment assemblies for engaging said second support member such that each of said adjustment assemblies are for engaging opposite sides of said mounting portion of said perch assembly, said adjustment assemblies being for producing tension against said mounting portion of said perch assemble for controlling resistance to rotation of said annular rings of said perch assembly around said second support member when the bird lands on one of said annular rings.

11. The bird perch apparatus as set for in claim 10 further comprising:

a pair of adjustment assemblies for engaging said second support member such that each of said adjustment assemblies are for engaging opposite sides of said mounting portion of said perch assembly, said adjustment assemblies being for producing tension against said mounting portion of said perch assembly for controlling resistance to rotation of said annular rings of said perch assembly around said second support member when the bird lands on one of said annular rings.

12. The bird perch apparatus as set forth in claim 11, wherein each of said adjustment assemblies comprises a threaded coupler, a biasing member and a washer, said washer being positioned adjacent said mounting portion of said perch assembly, said threaded coupler being for threadably engaging said second support member such that said biasing member is positioned between said threaded coupler and said washer, said threaded coupler being positionable closer to said mounting portion of said perch assembly such that said biasing member compresses said washer against said mounting portion of said perch assembly for increasing resistance to rotation, said threaded coupler being positionable away from said mounting portion of said perch assembly such that said biasing member reduces compression against said washer for decreasing resistance to rotation.

13. The bird perch apparatus as set forth in claim 12, wherein said biasing member comprise a spring for adjusting compression between said threaded coupler and said washer.

14. The bird perch apparatus as set forth in claim 12, wherein said washer comprises a friction enhancing material such that when compression between said mounting portion of said perch assembly and said washer is increased the friction between said washer and said mounting portion of said perch assembly is increased.

\* \* \* \* \*